US010431195B2

(12) United States Patent
Barefoot

(10) Patent No.: US 10,431,195 B2
(45) Date of Patent: Oct. 1, 2019

(54) METHOD OF FABRICATING STRUCTURES, AND STRUCTURES, WITH INTEGRATED PROPERTY ENHANCING FILL MATERIAL

(71) Applicant: BAREFOOT SOUND, LLC, Portland, OR (US)

(72) Inventor: Thomas Barefoot, Portland, OR (US)

(73) Assignee: Barefoot Sound, LLC, Portland, OR (US)

( * ) Notice: Subject to any disclaimer, the term of this patent is extended or adjusted under 35 U.S.C. 154(b) by 167 days.

(21) Appl. No.: 15/146,389

(22) Filed: May 4, 2016

(65) Prior Publication Data
US 2017/0323627 A1    Nov. 9, 2017

(51) Int. Cl.
| B29C 41/02 | (2006.01) |
| G10K 11/162 | (2006.01) |
| B29C 64/357 | (2017.01) |
| B22F 3/105 | (2006.01) |
| B29C 64/30 | (2017.01) |
| B29C 64/153 | (2017.01) |
| H04R 1/28 | (2006.01) |
| B33Y 10/00 | (2015.01) |
| B33Y 80/00 | (2015.01) |
| B28B 1/00 | (2006.01) |
| H04R 1/02 | (2006.01) |

(52) U.S. Cl.
CPC .......... *G10K 11/162* (2013.01); *B22F 3/1055* (2013.01); *B29C 64/153* (2017.08); *B29C 64/30* (2017.08); *B29C 64/357* (2017.08); *H04R 1/2888* (2013.01); *B28B 1/001* (2013.01); *B33Y 10/00* (2014.12); *B33Y 80/00* (2014.12); *H04R 1/02* (2013.01); *H04R 1/026* (2013.01)

(58) Field of Classification Search
CPC ..... B22F 3/1055; B29C 64/153; B29C 64/30; B29C 64/357; B33Y 40/00
USPC .......................... 264/497; 219/121.66, 121.85
See application file for complete search history.

(56) References Cited

U.S. PATENT DOCUMENTS

| 8,978,250 | B2* | 3/2015 | Barcock | ................. | B22F 3/1055 |
| | | | | | 29/419.1 |
| 2017/0184086 | A1* | 6/2017 | Scancarello | ............ | B33Y 10/00 |

* cited by examiner

*Primary Examiner* — Leo B Tentoni
(74) *Attorney, Agent, or Firm* — Munick Wilson Mandala

(57) ABSTRACT

Structures with integrally formed property enhancing fill material, and a method for fabricating such structures, are presented. In one or more embodiments, the method of the present invention includes forming the structural members of a structure out of a powdered material using selective laser sintering ("SLS") such that the structural members of the structure enclose one or more internal cavities. In one or more embodiments, the structure is provided with an internal passage that forms a direct connection between first and second external apertures. One or more internal apertures and or passages form a passage from one or more of the internal cavities to the internal passage connecting the external apertures. The internal passages and internal and external apertures are configured such that most of the compressed air applied to one of the external apertures flows directly to and out of the other external aperture without traversing the internal cavities, such that the bulk of unsintered powder remains in the cavities. In one or more embodiments, the powdered material is left inside selective portions of the structure's interior volume, while being removed from others.

7 Claims, 8 Drawing Sheets

METHOD OF FABRICATING STRUCTURES, AND STRUCTURES, WITH INTEGRATED PROPERTY ENHANCING FILL MATERIAL

BACKGROUND OF THE INVENTION

(1) Field of the Invention

The present invention relates generally to structures fabricated using additive manufacturing techniques (commonly known as "3D printing") and more particularly to a method for fabricating structures, and structures, with integrally formed property enhancing fill material.

(2) Description of the Related Art

Selective laser sintering ("SLS") is an additive manufacturing method in which small particles or powder (collectively referred to herein as "powder") are fused ("sintered") into a solid structure by a computer-controlled high-power laser. The powder may be made of plastic, metal, ceramic, glass, or any other material that can be sintered. The structure to be fabricated is defined by a 3D model (for example, a computer-aided design file). For purposes of SLS fabrication, the 3D model is broken into a series of layers, one stacked on top of the other. To fabricate a structure using SLS, the laser travels over a bed containing the powder to be sintered in a computer controlled path, sintering the powder in the locations that are defined by the 3D model as being the solid parts (e.g., external walls or internal ribs) of the structure being fabricated. After a layer has been sintered, another layer of powder is added on top of the previous layer, and the laser passes over the new layer of powder, once again selectively sintering the areas that form the solid parts of the structure being fabricated. The structure is thus built up one sintered layer at a time. The unsintered powder remains in place between the sintered portions until it is removed after fabrication is complete.

SLS is useful for rapid prototyping, low-volume production and the fabrication of complex shapes not achievable with conventional manufacturing methods. Unlike some other methods of additive manufacturing, such as polymer deposition, SLS allows the use of a wider range of materials and does not require the use of special support structures during fabrication, because the unsintered powder that remains in place provides such support. General background information relating to SLS may be found, for example, in U.S. Pat. Nos. 4,863,538; 5,597,589; and 5,817,206.

The cost of SLS fabrication is typically proportional to the amount of time required to fabricate an object. Thus, solid structures are more expensive to produce than similarly sized hollow structures because solid structures require much more powder area to be sintered and therefore require more fabrication time. To reduce fabrication time, structures are typically designed to omit as much internal solid structure as is possible while maintaining the desired strength and rigidity (thus minimizing the area of powder per layer that needs to be sintered).

Because the unsintered powder remains in place between the solid sintered portions, it is typically removed after the laser sintering has been completed, for example by blasting out the unsintered powder using compressed air or by applying a vacuum. To allow such removal of unsintered powder, at least one inlet and one outlet aperture is provided in an otherwise fully enclosed structure that connect the structure's interior volume to the exterior of the structure to allow the unsintered powder to be removed. The apertures must be sized and arranged such that the air flow pattern causes all or most of the powder to be removed. Thus, when compressed air is blown into the the inlet aperture, or when a vacuum is applied to the outlet aperture, all or most of the unsintered powder is removed by being blown out or sucked out of the structure through the applicable aperture. Third-party commercial SLS fabrication services typically require such powder removal apertures, which are also sometimes referred to as powder removal access ports, for any enclosed interior spaces or cavities of a structure to be fabricated and may refuse to fabricate a structure without such apertures.

For some applications, it may be desirable to fill a structure's internal cavities with material, for example to provide or enhance properties such as sound or vibration damping (e.g. particle damping), thermal insulation, structural strength, or increased weight or density. Typically, the material used to provide or enhance the desired property is different from the material from which the structure is fabricated. Materials typically used for property enhancing fill materials include plastic foam, sand, lead shot, fiberglass, and water. Heretofore, there has been no recognition that unsintered powder remaining after fabrication of a structure using SLS can itself be used in situ as a property enhancing fill material with beneficial properties for certain applications.

BRIEF SUMMARY OF THE INVENTION

Structures with integrally formed property enhancing fill material, and a method for fabricating such structures, are presented. In one or more embodiments, the method of the present invention includes forming the structural members of a structure out of a powdered material using selective laser sintering ("SLS") such that the structural members of the structure enclose one or more internal cavities. In one or more embodiments, the structure is provided with an internal passage that forms a direct connection between first and second external apertures. One or more internal apertures and/or passages form a passage from one or more of the internal cavities to the internal passage connecting the external apertures. The internal passages and internal and external apertures are configured such that most of the compressed air applied to one of the external apertures flows directly to and out of the other external aperture without traversing the internal cavities, such that the bulk of unsintered powder remains in the cavities. In one or more embodiments, the powdered material is left inside selective portions of the structure's interior volume, while being removed from others.

In embodiments in which the unsintered powdered material is left inside one or more internal cavities of a structure of the present invention, the structure retains some of the properties of a completely solid structure (including, for example, higher density and greater compressive strength) while at the same time having enhanced properties as compared to a completely solid structure (including, for example, greater internal vibration damping, improved sound and thermal insulation, and lower fabrication cost. Additionally, a structure of the present invention has enhanced properties as compared to a hollow structure. Such improved properties include, for example, internal vibration damping, greater compressive strength, the ability to have thinner walls while retaining the desired strength and rigidity of the structure, solid, well-built feel to the finished structure. Applications of the present invention that take advantage of the above benefits include, for example, speaker enclosures, pedestal legs, stands for speaker enclosures and enclosures for other consumer and professional electronic products.

BRIEF DESCRIPTION OF THE DRAWINGS

The present invention may be better understood, and its features made apparent to those skilled in the art by referencing the accompanying drawings.

The use of the same reference symbols in different drawings indicates similar or identical items.

DETAILED DESCRIPTION OF THE INVENTION

Structures with integrally formed property enhancing fill material, and a method for fabricating such structures, are presented. In one or more embodiments, the method of the present invention includes forming the structural members of a structure out of a powdered material using selective laser sintering ("SLS") such that the structural members of the structure substantially enclose one or more interior cavities, and leaving the powdered material inside the internal cavities instead of being removed as described in the prior art. In one or more embodiments, the present invention includes a structure formed using the method described above.

Figure 1:
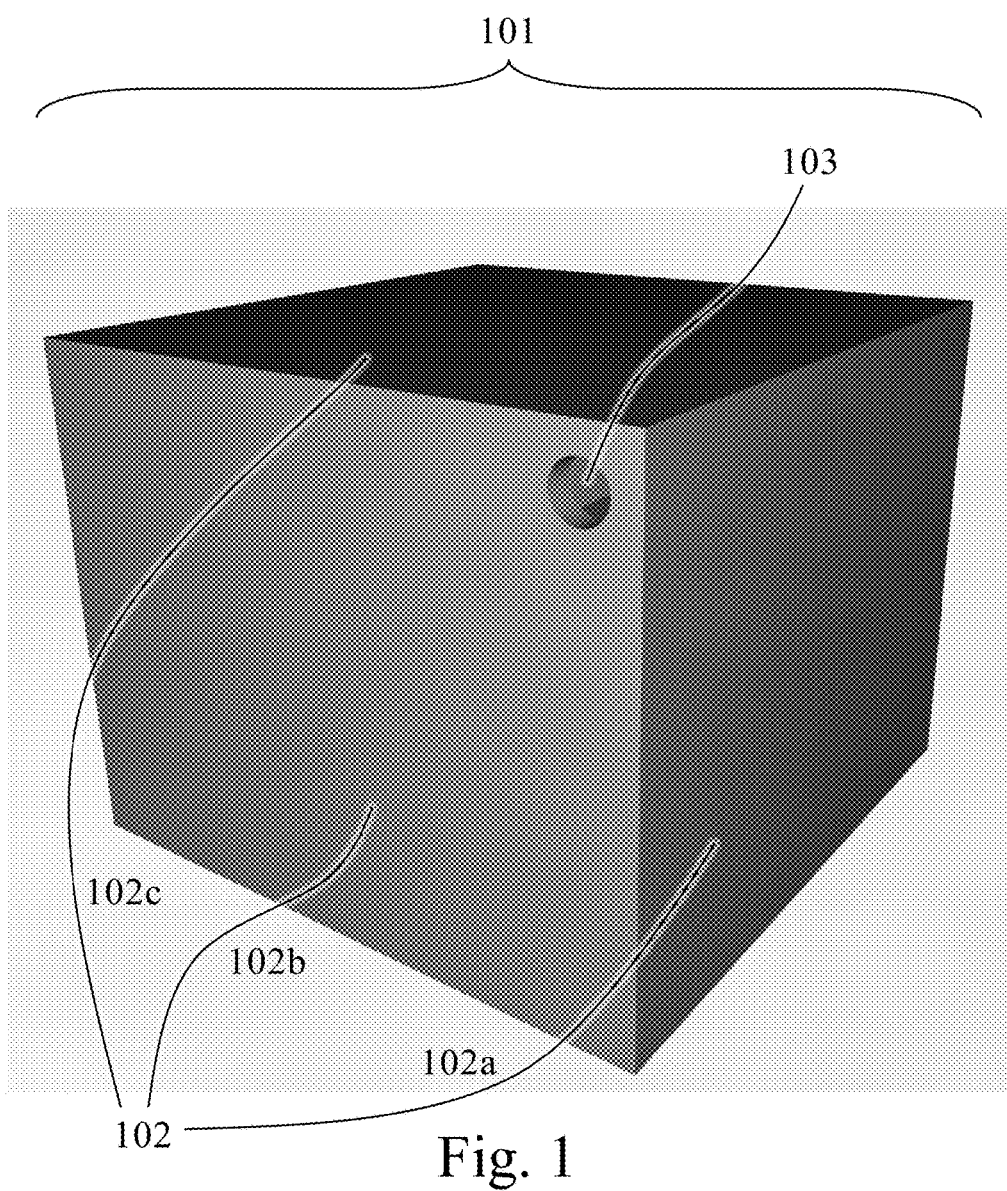
FIG. 1 is a perspective shaded view of a cube-shaped structure, which is an embodiment of the present invention.
Figure 2:
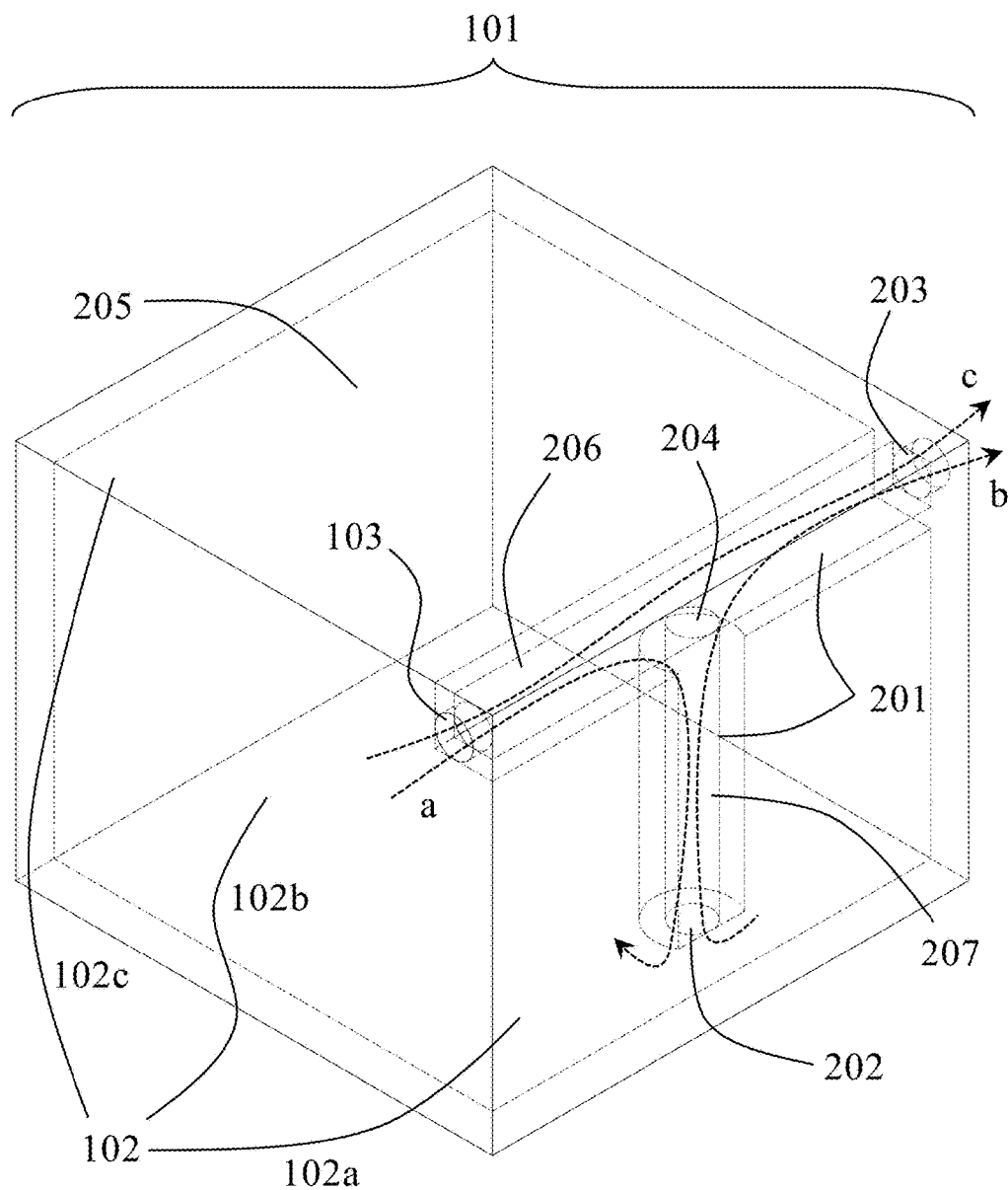
FIG. 2 is an isometric view of the embodiment of the present invention of FIG. 1.
Figure 3:
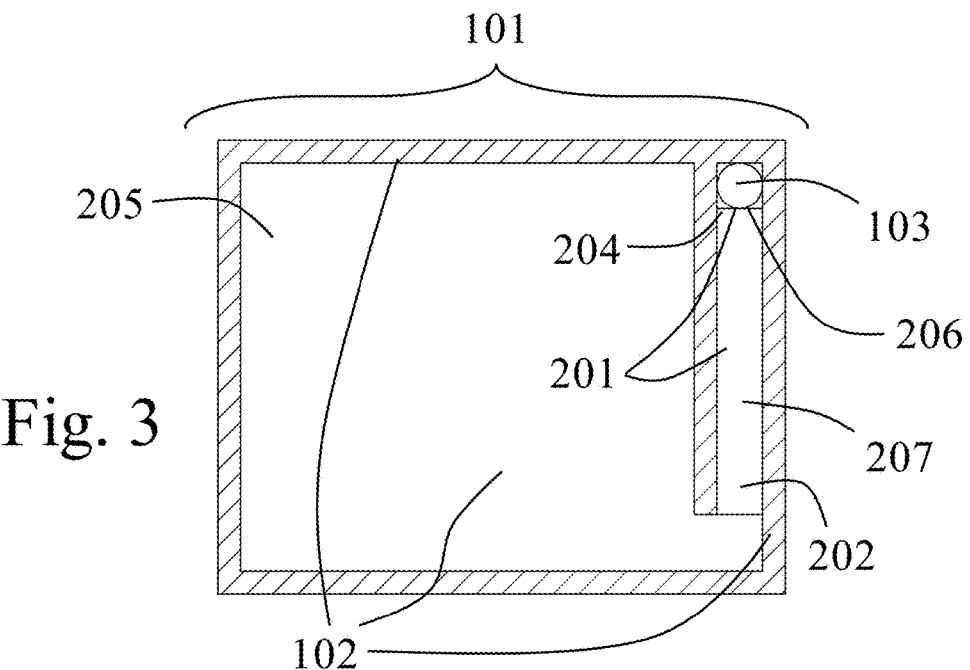
FIG. 3 is a side view of the embodiment of the present invention of FIG. 1 showing interior detail.
Figure 4:
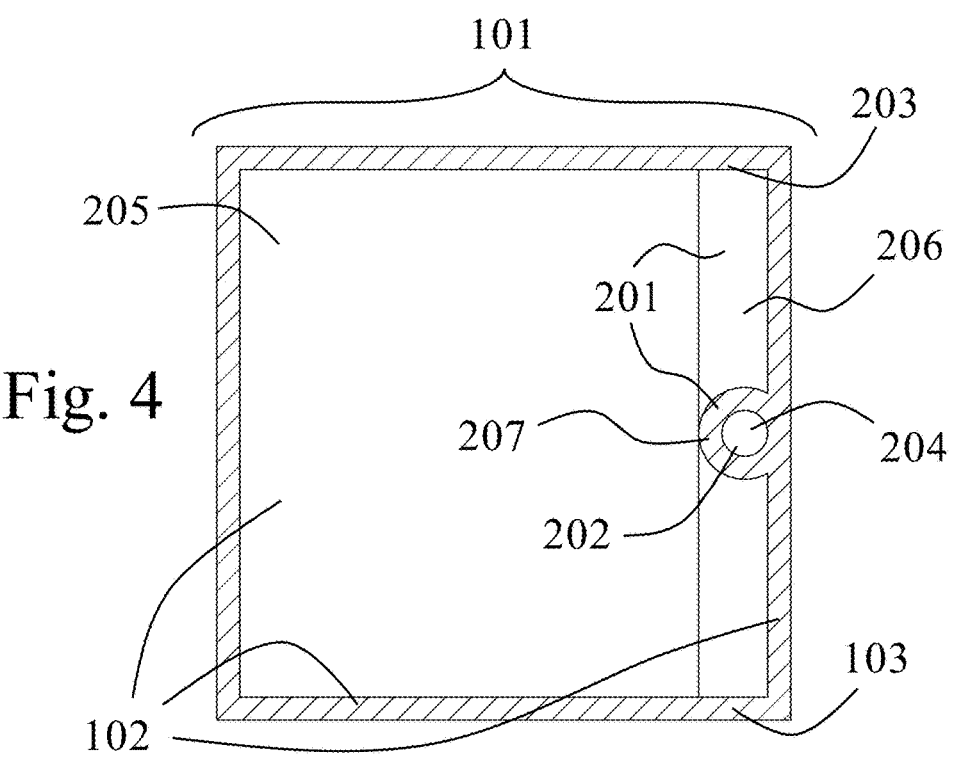
FIG. 4 is a top view of the embodiment of the present invention of FIG. 1 showing interior detail.

FIGS. 1-4 show an embodiment of a structure 101 of the present invention. FIG. 1 is a perspective view generated from an STL (stereolithography) file that was created using CAD software. STL files define the surfaces of a structure. With appropriate processing (for example by "slicing" software that slices the structure into multiple layers), an STL file can be used by a 3D printer to fabricate the 3D structure described in the file. FIGS. 2-4 show internal views of structure 101.

In the embodiment of FIGS. 1-4, structure 101 is a cube formed from powdered material using SLS. Cube 101 has walls 102 that enclose an interior volume of cube 101, of which walls 102a, 102b and 102c are visible in FIG. 1. Walls 102 may be of any thickness that is sufficient to provide the desired structural strength of cube 101. The interior volume of cube 101 contains the unsintered powdered material remaining after forming walls 102. The powdered material may be plastic, metal, ceramic, glass, or any other material that can be sintered. In one or more embodiments, cube 101 is formed by using SLS to build walls 102 one layer at a time until cube 101 fully encloses the unsintered powdered material.

As required by typical SLS fabricators, cube 101 includes two external apertures 103 and 203 (shown in FIG. 2) that provide openings from the exterior of cube 101 into its interior. Access ports or openings into internal cavities of structures fabricated using SLS are typically required by SLS modeling software, fabrication machines, and/or fabrication services to allow the unsintered powder to be removed from interior volumes of structures being fabricated. If such access ports are not present, some tools and/or services will refuse to fabricate the desired structure. Thus, external apertures 103 and 203 allow the structure of the present invention to be fabricated using tools and services that require openings from the exterior to the interior volumes of structures fabricated by them. However, as described below in reference to FIGS. 2-4, even though apertures 103 and 203 provide a path from the interior volume of cube 101 to its exterior, the internal structure of cube 101 is fabricated such that the bulk of the unsintered powder will remain inside cube 101 if compressed air or a vacuum is applied to aperture 103 or 203.

FIGS. 2-4 show views of the internal structure of cube 101. FIG. 2 is an isometric 3D view from a similar vantage point as the view of FIG. 1. FIG. 3 is a side view, and FIG. 4 is a top view of the embodiment shown in FIG. 1. In the embodiment of FIGS. 2-4, apertures 103 and 203 do not open directly into the interior volume 205 of cube 101. Instead, they open into a T-shaped passage 201 formed adjacent to the inside surface of wall 102a of cube 101. T-shaped passage 201 includes passage 206 that forms the top of the T and passage 207 that forms the leg of the T. Aperture 103 is disposed at one end of passage 206 while aperture 203 is disposed at the other end of passage 206. The top end of passage 207 forms a junction 204 with passage 206 roughly halfway between apertures 103 and 203. The bottom end of passage 207 opens into interior volume 205 of cube 101 near the bottom of wall 102a via internal aperture 202, which forms an access port for interior volume 205.

Figure 12:
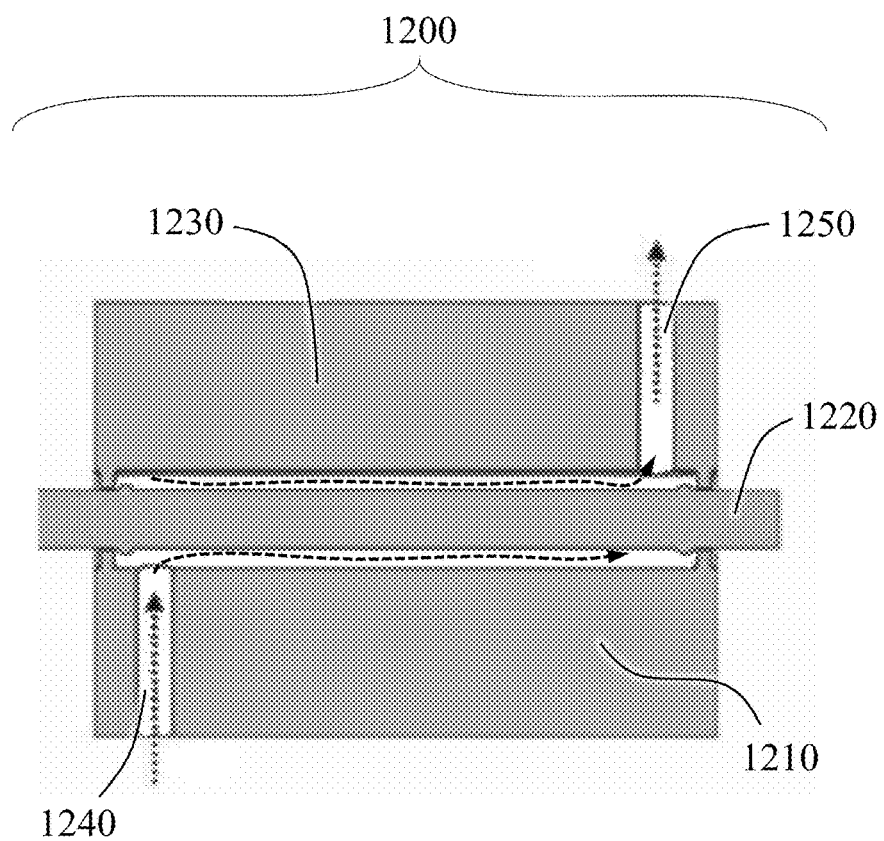
FIG. 12 is a cross-sectional view of a prior art design for a structure fabricated by SLS.

As discussed above, some SLS fabricators require that a structure designed for SLS fabrication must include powder removal access ports for any internal cavities that provide an open path from each such interior cavity to the exterior of the structure. A minimum size for such access ports may also be specified. The intended purpose of such access ports is to allow removal of unsintered powder from internal cavities of the structure after fabrication. FIG. 12 shows an example configuration of powder access removal ports as known in the prior art. FIG. 12 is a cross-sectional view of a design for a structure 1200 intended to be fabricated using SLS. Structure 1200 includes a solid body portion 1210 and an enclosed interior volume 1230 in which an integrally fabricated axle 1220 is disposed. After fabrication, unsintered powder remains in enclosed interior volume 1230. To allow removal of the unsintered powder, structure 1200 includes an inlet access port 1240 that forms a first path from enclosed volume 1230 to the exterior of structure 1200 and an outlet access port 1250 that forms a second path from enclosed volume 1230 to the exterior of structure 1200. As shown by the arrows in FIG. 12, compressed air blown into inlet access port 1240 will pass through enclosed volume 1230 and out of outlet access port 1250, thereby blasting any unsintered powder remaining in enclosed volume 1230 out of outlet access port 1250. Alternatively, a vacuum applied to outlet access port 1250 would suck outside air through inlet access port 1240 into enclosed volume 1230 and out of outlet access port 1250, removing unsintered powder from enclosed volume 1230 in a similar manner.

The combination of of external apertures 103 and 203, T-shaped passage 201, and internal aperture 202 of the cube 101 also form first and second continuous, open paths between enclosed volume 205 of cube 101 and the exterior of cube 101. A first path, shown by arrow "A" in FIG. 2, goes from external aperture 103 through passage 206 to junction 204, then down passage 207 to internal aperture 202. A second path, shown by arrow "B" in FIG. 2, goes from internal aperture 202 up through passage 207 to junction 204, then through passage 206 to external aperture 203. Thus, in cube 101, like in prior art structure 1200 of FIG. 12, there are two continuous open paths from the enclosed interior volume to the exterior. However, unlike in prior art structure 1200, applying compressed air or a vacuum to either of the external apertures 103 or 203 will not result in removal of the bulk of the unsintered power remaining in enclosed interior volume 205. Instead, because passage 206 directly connects external aperture 103 with external aperture 203, the primary air flow path from external aperture 103 to external aperture 203 (and vice versa) does not pass through enclosed interior volume 205 of cube 101, but goes directly from external aperture 103 to external aperture 203. That is, passage 206 forms a direct continuous air flow path from external aperture 103 to external aperture 203 (indicated by arrow "C" in FIG. 2). As a result, when compressed air is injected into external aperture 103 after SLS fabrication is completed, the bulk of the air will flow through passage 206 and out through external aperture 203 without passing through enclosed interior volume 205 along the way. Although some unsintered power (for example the powder remaining in passages 206 and 207) may be removed by the air flow, the bulk of the unsintered powder in enclosed interior volume 205 will remain there.

Figure 5:
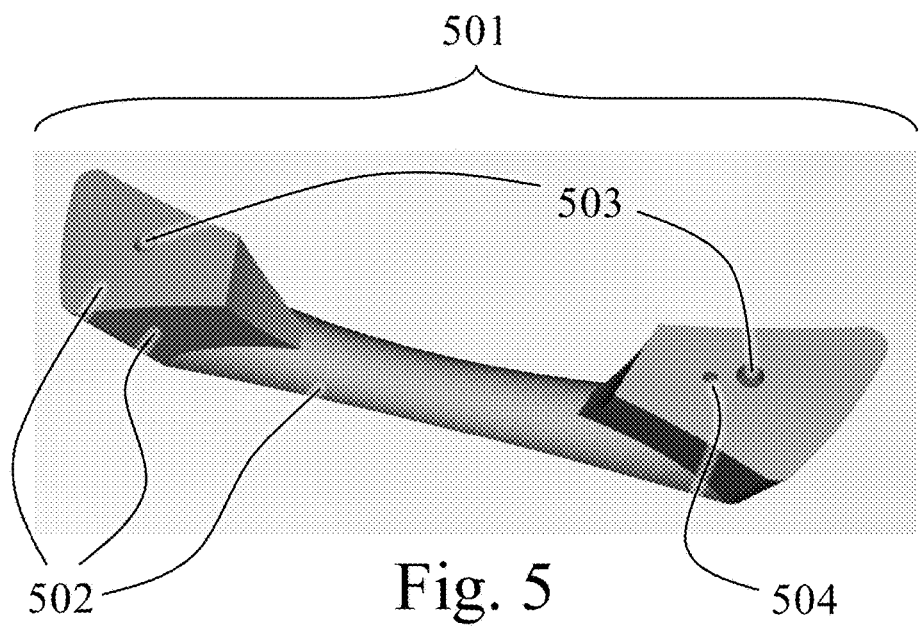
FIG. 5 is a perspective shaded view of a speaker pedestal, which is an embodiment of the present invention.
Figure 6:
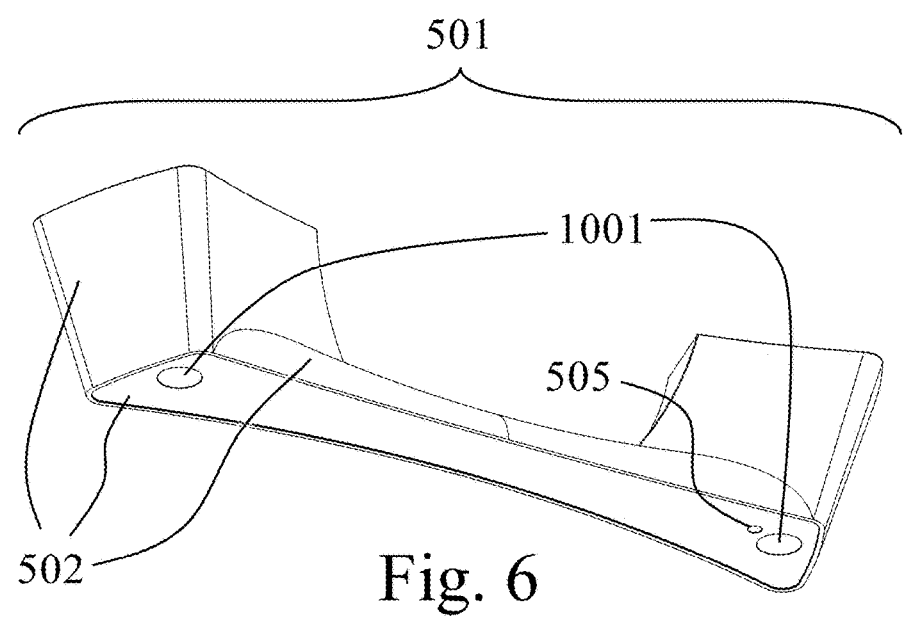
FIG. 6 is an isometric view of the embodiment of the present invention of FIG. 5.
Figure 7:
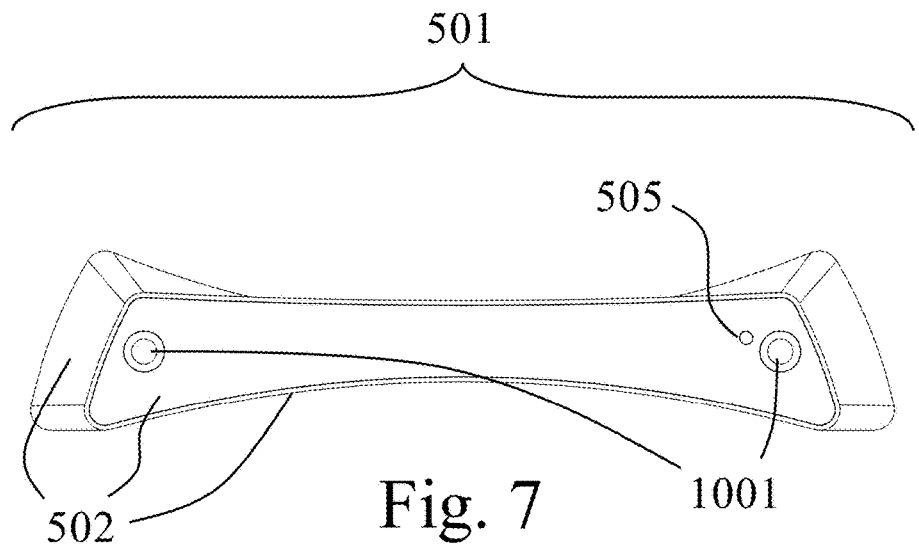
FIG. 7 is a bottom view of the embodiment of the present invention of FIG. 5.
Figure 8:
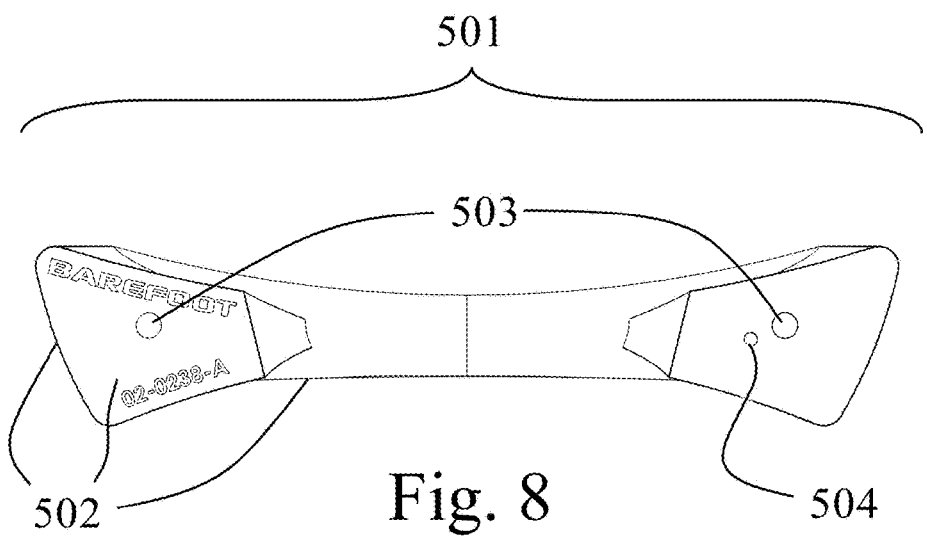
FIG. 8 is a top view of the embodiment of the present invention of FIG. 5.
Figure 9:
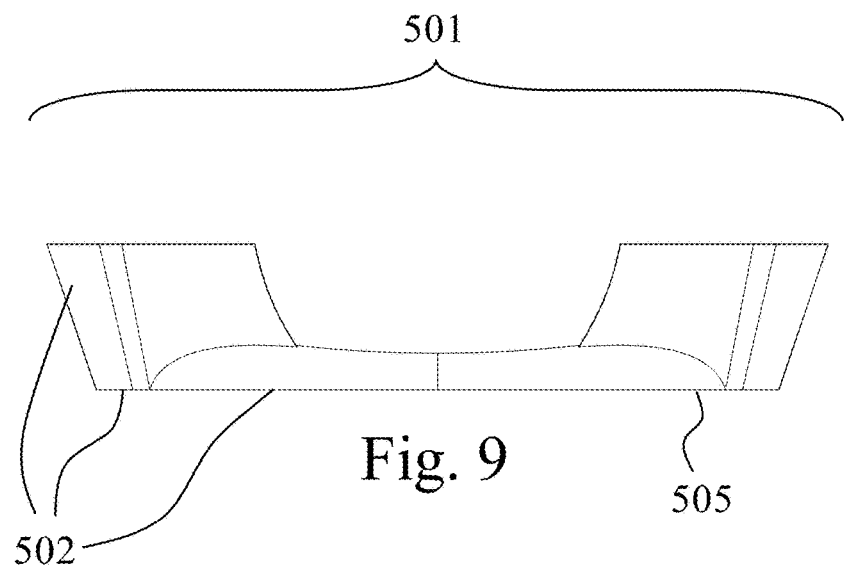
FIG. 9 is a side view of the embodiment of the present invention of FIG. 5.
Figure 10:
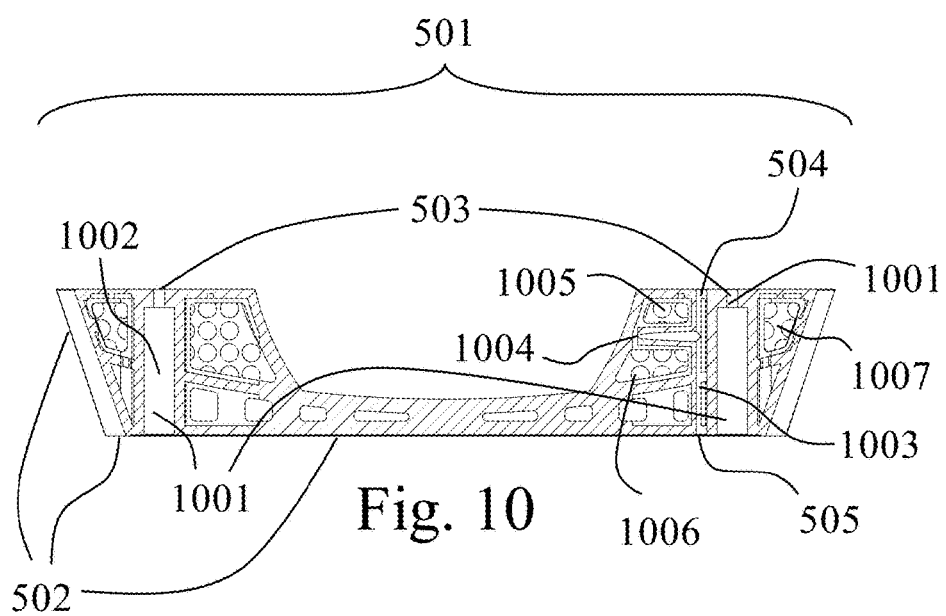
FIG. 10 is a side view of the embodiment of the present invention of FIG. 5 showing interior detail.

FIGS. 5-10 show an embodiment of a structure of the present invention, which is a speaker pedestal 501 formed using the method of the present invention. FIG. 5 is a perspective view generated from an STL file as described above in reference to FIG. 1. FIG. 6 is an isometric 3D view of the embodiment shown in FIG. 5. FIG. 7 is a bottom view, FIG. 8 is a top view, and FIG. 9 is a side view of the embodiment shown in FIG. 5. FIG. 10 is a side view of the internal structure of the embodiment shown in FIG. 9.

In the embodiment of FIGS. 5-10, speaker pedestal 501 is a structure formed from powdered material using SLS. Instead of having a single enclosed interior volume like enclosed interior volume 205 of cube 101, speaker pedestal 501, shown in FIG. 10, has several internal cavities including cavities 1005, 1006 and 1007 that are enclosed by structural members 502, which include, for example, outside walls and internal support ribs and reinforcements of speaker pedestal 501. Structural members 502 may be of any thickness that is sufficient to provide the desired structural strength of speaker pedestal 501. In one or more embodiments, as shown in FIG. 10, speaker pedestal 501 includes recessed mounting points 503 that allow speaker pedestal 501 to be affixed to another structure with one or more fasteners (e.g., machine screws). In one or more embodiments, mounting points 503 are accessible by means of a mounting point access passage 1001 that allows a fastener to be inserted from the bottom of access passage 1001.

In the embodiment of FIGS. 5-10, speaker pedestal 501 includes first and second external apertures 504 and 505 joined by internal passage 1003, which forms a direct air flow pathway between external apertures 504 and 505. Additional internal passages (not visible in FIGS. 5-10) join each of internal cavities 1005, 1006 and 1007 with internal passage 1003. Those internal passages constitute access ports to internal enclosed cavities that provide continuous open air flow paths from each cavity to the exterior that may be required by SLS modeling software, fabrication machines, and/or fabrication service design rules. In the same manner described above with respect to cube 101, applying compressed air or a vacuum to either of the external apertures 504 or 505 will not result in removal of the bulk of the unsintered power remaining in interior cavities 1005, 1006 and 1007. Instead, because internal passage 1003 directly connects external aperture 504 with external aperture 505, the primary air flow path from external aperture 504 to external aperture 505 (and vice versa) does not pass through internal cavities 1005, 1006 and 1007, but goes directly from external aperture 504 through internal passage 1003 to external aperture 505. As a result, as with cube 101, when compressed air is injected into external aperture 504 after SLS fabrication is completed, the bulk of the air will flow through internal passage 1003 and out through external aperture 505 without passing through internal cavities 1005, 1006 and 1007 along the way. Although some unsintered power (for example the powder remaining in internal passage 1003) may be removed by the air flow, the bulk of the unsintered powder in internal cavities 1005, 1006 and 1007 will remain there.

Figure 11:
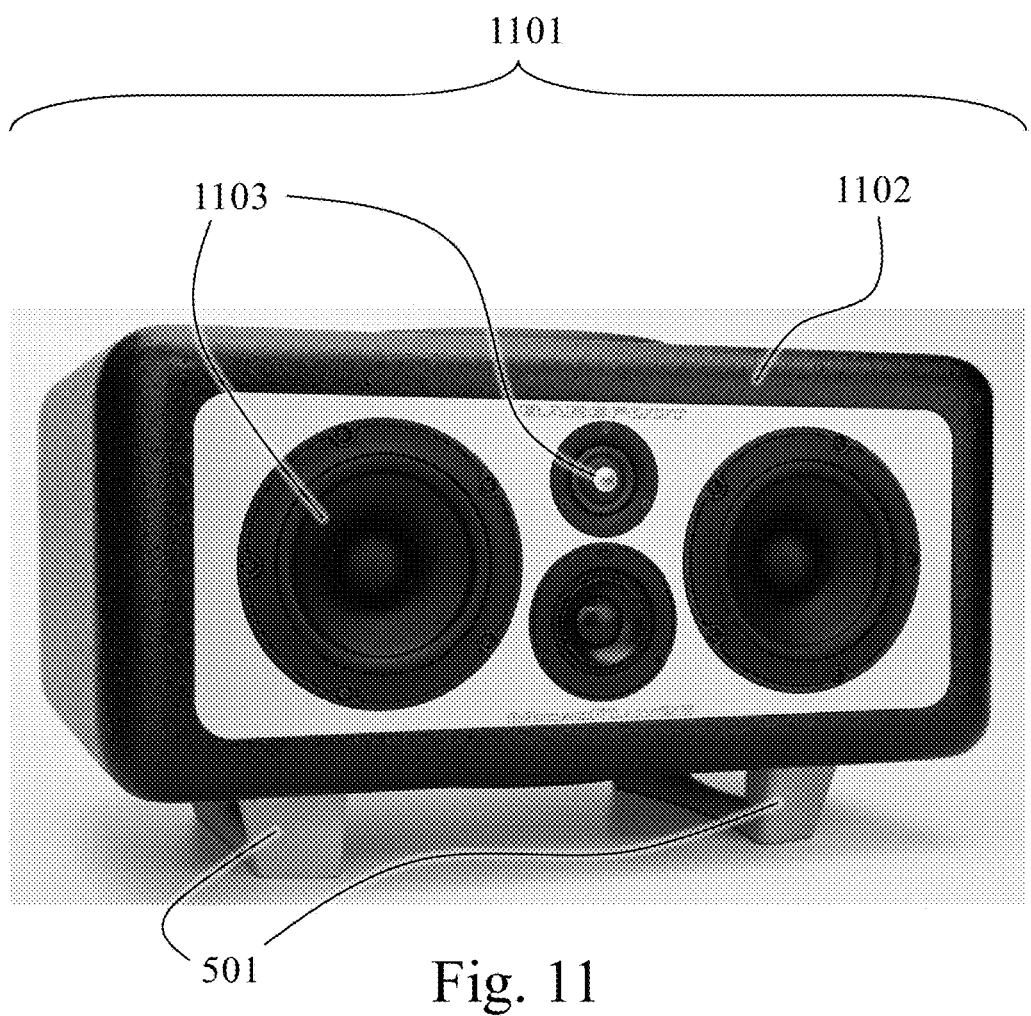
FIG. 11 is a perspective shaded view of a speaker cabinet and two speaker pedestals, each of which are embodiments of the present invention.

FIG. 11 shows an embodiment of a loudspeaker assembly 1101 that includes structures of the present invention. Loudspeaker assembly 1101 includes two speaker pedestals 501 like the one shown in FIGS. 5-10, along with a speaker cabinet 1102 and speaker drivers 1103. The speaker pedestals 501 are formed using the method of the present invention, such that unsintered powder remains present in the internal cavities of pedestals 501. The unsintered powder within the internal cavities of pedestals 501 helps absorb vibrations generated by speaker drivers 1104 and thereby reduces or eliminates those vibrations from propagating between loudspeaker assembly 1101 and the surface it rests upon.

The method of the present invention thus allows vibration damping to be incorporated into the finished structure during the SLS fabrication process, without adding the extra cost and extra step of inserting vibration damping material into the hollow spaces of the structure after the completion of the SLS process. Further, because the inclusion of vibration damping material is an integral part of the SLS fabrication process, the method of the present invention allows the vibration damping material to be completely sealed inside the finished structure, instead of requiring a means to insert vibration damping material (e.g., sand or polymer foam) into the hollow spaces of the structure.

Because unsintered powdered material is left inside internal cavities of structures of the present invention, a structure of the current invention exhibits some of the properties of a completely solid structure, including higher density and greater compressive strength. However, a structure of the present invention has certain benefits over a completely solid structure, including greater internal vibration damping and lower fabrication cost. Additionally, a structure of the present invention has certain benefits over a hollow structure, including greater internal vibration damping, greater compressive strength, the ability to use thinner walls while retaining the desired strength and rigidity, and a high-quality, solid, well-built feel to the finished structure. Applications of the present invention that take advantage of the above benefits include speaker enclosures, pedestal legs or stands for speaker enclosures, and enclosures for other consumer and professional electronic products.

Thus, a method and apparatus for fabricating structures, and structures, with internal property (e.g., vibration damping) enhancing material is described. Although the present invention has been described with respect to certain specific embodiments and certain specific 3D shapes, it will be clear to those skilled in the art that the inventive features of the present invention are applicable to other embodiments as well, all of which are intended to fall within the scope of the present invention. For example, although the property enhanced by the unsintered powder remaining in internal cavities of the structure of the invention has been described as vibration damping, other properties may be enhanced, including compressive strength, density, acoustic insulation and dampening, thermal insulation, and others.

What is claimed is:

1. A method of fabricating a structure comprising integrally formed property enhancing fill material comprising the steps of:

fabricating said structure by selective laser sintering of a first material, said first material comprising said property enhancing fill material, said structure comprising first and second external apertures connected by a first internal passage and a first internal cavity, said first internal cavity comprising a first internal aperture connecting said first internal cavity to said first internal passage, said first internal cavity comprising a first amount of unsintered said first material after said fabrication;

applying a compressed gas to said first external aperture such that a portion of said compressed gas flows from said first external aperture through said first internal passage to said second external aperture without passing through said internal cavity such that after said application of said compressed gas to said first external aperture is completed, a majority of said first amount of unsintered first material remains in said first internal cavity.

2. The method of claim 1 wherein said compressed gas comprises compressed air.

3. The method of claim 1 wherein said property is vibration dampening.

4. The method of claim 1 wherein said property is density.

5. The method of claim 1 wherein said property is thermal insulation.

6. The method of claim 1 wherein said property is acoustic dampening.

7. The method of claim 1 wherein said property is compressive strength.

* * * * *